The present invention relates to improvements in wheel structures and more particularly concerns the ornamental and protective covering of the outer sides of vehicle wheels.

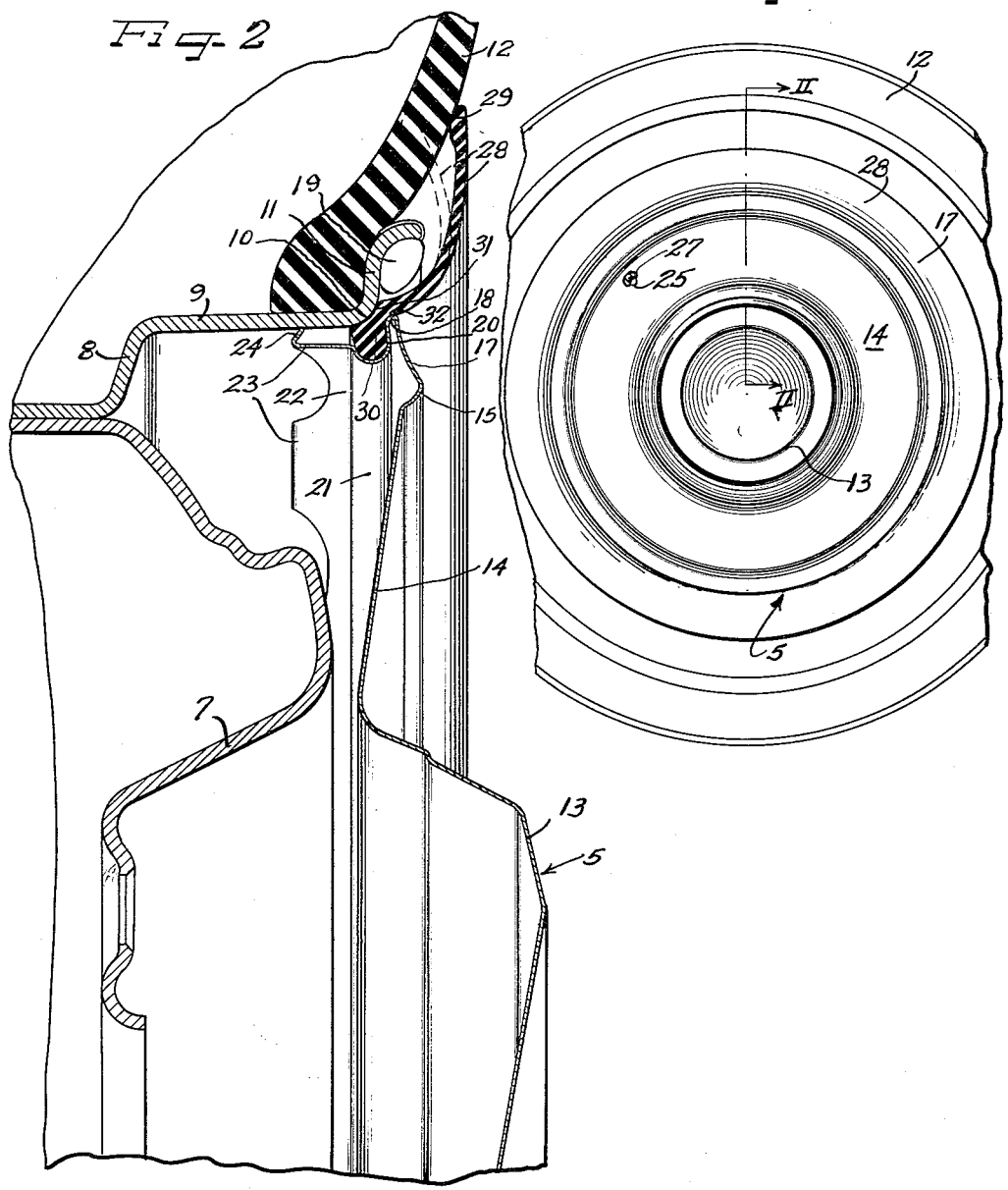
Inventor
George Albert Lyon 3,050,340
WHEEL COVER
George Albert Lyon, Detroit, Mich., assignor to Lyon Incorporated, Detroit, Mich., a corporation of Delaware
Filed Feb. 10, 1958, Ser. No. 714,206
4 Claims. (Cl. 301—37)

For ornamental purposes, automobile tires are commonly provided with white sidewalls, the remainder of the tire being of a more or less black appearance. The white rubber used for the white sidewall is applied as a veneer and is of a different composition from the remainder or body of the tire and actually requires a different vulcanizing treatment, to the extent that the temperature and time of cure are somewhat different from the black rubber of the tire body. This has created some necessity for compromise in the vulcanization of tires with white sidewalls, generally resulting in some sacrifice of quality.

To overcome the disadvantages of cure compromise, it has been proposed to secure the white sidewall portion or veneer to the sidewall of the tire after the tire has been vulcanized. Such after-attached sidewall members are inherently liable to such disadvantages as peeling, and the like and of course require a separate attaching or vulcanizing operation and equipment that raises costs.

It has also been heretofore proposed to provide separate simulated white sidewall ring members that are secured between the terminal flange of the tire rim and the bead portion of the tire and separably hug the sidewall of the tire. Such simulated or mock tire white sidewall rings require, of course, that the tire be deflated in order to install the ring members. Should such simulated sidewall rings become damaged, it is necessary to deflate the tire not only to remove the damaged ring but also to replace the ring. Furthermore, a disadvantage of such simulated white sidewall rings is that, especially with tubeless tires there is apt to be interference with proper sealing, gripping engagement of the tire bead portion with the opposing surfaces of the tire rim and more particularly the terminal flange between which and the tire bead the simulated white sidewall ring is clampingly interposed.

It is accordingly an important object of the present invention to overcome the foregoing and other difficulties and disadvantages of the prior expedients and to provide a simulated tire sidewall of improved appearance and which can be applied or removed, or replaced without disturbing the tire.

Another object of the invention is to provide an improved tire sidewall simulating member which serves also as means for covering the tire rim terminal flange as well as wheel balancing weights that may be carried by such flange.

A further object of the invention is to provide a novel tire sidewall simulating ring member which is adapted for optional assembly with a wheel cover for disposition over the outer side of the wheel.

Yet another object of the invention is to provide a tire sidewall simulating flexible ring device which is adapted to be carried in seating engagement with the outer side of a tire rim.

It is a further object of the invention to provide a novel tire sidewall simulating extension ring structure which is adapted to be carried by a wheel cover and in assembly with the wheel serves as cushioning and turn-preventing means for the wheel cover.

Other objects, features and advantages of the present invention will be readily apparent from the following detailed description of a preferred embodiment thereof taken in conjunction with the accompanying drawing, in which:

FIGURE 1 is an outer side elevational view of a vehicle wheel embodying features of the invention; and FIGURE 2 is an enlarged fragmentary radial sectional detail view taken substantially on the line II—II of FIGURE 1.

A wheel cover 5 is constructed and arranged to be applied over the outer side of a wheel such as an automobile wheel comprising a disk spider wheel body 7 supporting in the usual way a tire rim of the drop center multi-flange type having an outer side flange 8 from which extends generally axially outwardly an intermediate flange 9 joining on a generally radially inwardly and axially outwardly facing annular rounded shoulder 10 a terminal flange 11. A pneumatic tire 12 which may be of the tubeless type is adapted to be supported by the tire rim.

The wheel cover 5 is adapted to be made as a drawn stamping from suitable sheet or strip metal stock such as stainless steel, brass or the like and includes a central crown portion 13 about which is a generally axially inwardly dished intermediate portion 14 of substantial width adapted to overlie the wheel body and terminating in a marginal annular portion including a reinforcing rib 15 from which projects generally radially outwardly and axially inwardly a marginal extremity portion 17 having a turned finishing and reinforcing edge 18 of a diameter to overlie the tire rim shoulder 10 but to be substantially spaced from one or more wheel balancing weights 19 carried by the terminal flange 11.

For self-retention of the cover 5 with respect to the outer side of the wheel, it is provided behind the marginal portion 17 with means for press-on, pry-off retaining engagement with the tire rim and more particularly the intermediate flange 9. To this end, an underturned, generally radially inwardly extending annular flange 20 integral with the turned edge 18 is provided joined by an annular reinforcing channel rib 21 to a generally axially inwardly extending flange portion 22 which is adapted in assembly with the wheel to telescope in spaced relation into the axially outer portion of the intermediate flange 9. The flange portion 22 is provided with a plurality of retaining finger extensions 23 having short and stiff generally radially and axially outwardly oblique terminal flanges 24 adapted to engage in retaining gripping edgewise relation against the opposing radially inwardly facing surface of the intermediate flange 9. Through this arrangement, the cover is adapted to be applied to the outer side of the wheel by registering a valve stem 25 carried by the side flange 8 through a valve stem aperture 27 in the intermediate portion 14 of the cover, and then pressing the cover axially inwardly to effect retaining gripping engagement of the several finger terminals 24 with the intermediate flange 9. During this application of the cover, the retaining fingers 23 are resiliently flexibly deflected radially inwardly from a slightly larger diameter and placed under resilient tension reacting to drive the tips of the terminals 24 retainingly against the intermediate flange.

In order to afford for the outer side of the wheel the appearance of the tire 12, and more particularly the outer sidewall thereof, merging with the edge of the cover 5 at the turned extremity 18, a tire sidewall simulating, non-metallic ring member 28 is provided. While this ring member may be white in order to provide a white sidewall appearance for the tire, it may also be provided in various other color effects for ornamental, car model identification, or other design effects. By preference, the ring member 28 is made from a rubber or rubber-like material such as one of the suitable plastic, synthetic rubbers of which butyl is an example. Such material is characterized by efficient durometer control, high quality pigmentation capability, desirable resiliency and elasticity with nevertheless high flexibility, and durability as well as ease of molding and vulcanization for mass production purposes.

In a preferred construction, the non-metallic sidewall simulating ring member 28 is formed in generally concave convex cross-section generally similar to the incurve of the tire sidewall when assembled with the tire. However, to enable self-positioning, continuous hugging engagement and following or adjustment with respect to the tire sidewall in any condition of inflation or deflation of the tire in any circumferential portion thereof, including "live" movements in the running of the tire with the wheel, the ring member 28 is constructed in the tire sidewall overlapping portion thereof normally to assure a smaller radius cross-sectional shape substantially as shown in dash outline in FIGURE 2, wherein at least the radially outer portion of the ring member including a tip portion 29 thereof at its radially outer extremity, is disposed more axially inwardly than in an axially outwardly flexed, resiliently tensioned tire sidewall engaging condition or position as shown in full outline in FIGURE 2. This relationship assures the firm face-to-face hugging self-adjustable relation of the edge portion 29 against the tire sidewall under resilient tension. It will be noted in this instance that the edge portion 29 is in the form of an annular thickened bead-like axially inwardly bulged pad for contact with the opposing tire sidewall. By the rounded form of the pad edge portion 29, scuffing of the engaged tire sidewall portion during relative sliding movement in service, is avoided because contact is limited to an annular line engagement of the bead-like pad against the tire sidewall.

From its outer edge portion 29 where it is engageable with the tire sidewall, the ring member 28 extends radially and axially curvingly inwardly to an inner diameter wherein it clears the wheel weight 19 and is engageable with the tire rim shoulder 10 under the outer marginal underturned flange 20 and edge 18 of the cover 5. To this end, the ring member 28 is provided with an inner marginal thickened flange annular portion 30 provided with an annular concave generally axially inwardly and radially outwardly facing seat 31 engageable against the rim shoulder 10. Axially outwardly from the seat 31 is provided a reentrant annular groove 32 within which the cover edge 18 is engageable for thereby clamping the intervening juncture neck portion of the ring between the body of the ring and the inner marginal thickened flange 30 toward and against the rim shoulder 10.

In order to afford a substantially interlocked unitary assembled relationship of the ring member 28 with the cover 5, the inner marginal thickened flange 30 of the ring member is dimensioned and proportioned to engage interlockingly within the radially outwardly opening groove provided by the cover flange rib-groove portion 21. Since the bottom of the groove within the rib 21 is of substantially smaller diameter than the edge diameter of the cover and the diameter of the axially inner flange portion 22, it will be appreciated that an effectively interlocked condition of the bead-like inner marginal thickened flange 30 of the ring member within the groove is afforded whereby the ring member is held in positive axial relationship to the cover 5 and is adapted to be carried by the cover when the ring-cover assembly is off of the wheel. On the wheel, the cover margin clamps the ring member inner marginal portion against the tire rim and effects between the edge 18 of the cover and the shoulder 10 of the tire rim, a restricted clearance only as wide as the thickness of the intervening neck portion of the ring member and substantially narrower than the thickness of the bead-like inner thickened marginal portion 30 of the ring member which is thus effectively interlocked against pulling out from under the cover.

Access to the terminal flange 11 for placing or removal of wheel balancing weights 19 can easily be had by bending the flexible ring member 28 open about a fulcrum provided by the rounded cover edge 18.

In view of the substantial interengaging surface areas of the ring member inner marginal bead 30 and the rib groove portion 21 as well as the underturned flange 20 of the cover, thorough frictional resistance against relative turning of the cover and the ring member is afforded. In addition, since the ring member in the seat 31 makes substantial seated contact over a substantial area of the tire rim on the shoulder 10, substantial resistance against relative turning of the ring member 28 and the wheel is assured due to the high coefficient of friction of the material of the ring member. Thus, the ring member serves as a substantial turn-preventing means for the cover 5.

In addition, since the inner marginal bead flange 30 of the ring member is interposed between a substantial radially outwardly facing portion of the cover marginal flange and the opposed generally radially inwardly facing portion of the tire rim, the inner marginal flange bead 30 affords a cushion for the margin of the cover against diametrical forces in service.

For removing the cover 5 from the wheel, the ring member 28 may be flexed locally axially outwardly and a pry-off tool such as a screwdriver then inserted behind the cover marginal flange 20 by introduction of the tip of the pry-off tool behind the shoulder 31 of the ring member. Application of axially outward pry-off force then results in sliding of the tips of the retaining finger terminals 24 axially outwardly from engagement with the intermediate flange 9 of the tire rim. During this pry-off leverage, the resilient ring flange 30 affords protection against pry-off tool damage or denting of the cover margin shoulder structure.

Although the cover 5 has been shown as of the full disk type, it may, of course, be constructed as a ring for overlying the tire rim and possibly also the adjacent portion of the wheel body.

This application is a continuation-in-part of my copending application Serial No. 682,692 filed Sept. 9, 1957.

It will be understood that modifications and variations may be effected without departing from the scope of the novel concepts of the present invention.

I claim as my invention:

1. In a wheel structure including a tire rim having intermediate and terminal flanges and supporting a tire with the sidewall projecting generally radially outwardly beyond the terminal flange, a cover assembly for overlying disposition to the outer side of the wheel including a sheet metal cover member having an outer marginal portion having therebehind a cover retaining flange structure comprising a generally radially inwardly extending portion and a generally axially inwardly extending portion with a radially inwardly projecting juncture rib of substantial radius bulging radially inwardly substantially beyond said axially inwardly extending portion and providing a radially outwardly opening annular groove, said axially inwardly extending flange portion having a free terminal structure with cover retaining means thereon engageable with a portion of said intermediate flange in press-on, pry-off relation, and a tire sidewall simulating non-metallic ring member having a thickened marginal flange structure retainingly engaged within said groove and projecting generally radially outwardly beyond said cover marginal portion to a diameter for overlying the tire sidewall radially outwardly beyond said terminal flange, said radially inwardly extending flange portion of the cover member engaging and clamping a portion of said non-metallic member radially outwardly adjacent to said thickened flange structure against the tire rim.

2. In a wheel structure including a tire rim having intermediate and terminal flanges joining on a generally radially inwardly and axially outwardly facing rounded annular shoulder and correlated for supporting a tire with the sidewall projecting generally radially outwardly beyond the terminal flange, a cover assembly for overlying disposition to the outer side of the wheel including a sheet metal cover member having an outer marginal portion having therebehind a cover retaining flange structure comprising a generally radially inwardly extending portion and a generally axially inwardly extending portion with a radially inwardly projecting juncture rib of substantial radius bulging radially inwardly substantially beyond said axially inwardly extending portion and providing a radially outwardly opening annular groove, said axially inwardly extending flange portion having a free terminal structure with cover retaining means thereon engageable with a portion of said intermediate flange in press-on, pry-off relation, and a tire sidewall simulating non-metallic ring member having a thickened inner marginal flange structure retainingly engaged within said groove and projecting generally radially outwardly beyond said cover marginal portion to a diameter for overlying the tire sidewall radially outwardly beyond said terminal flange, said non-metallic member having radially outwardly adjacent to said thickened flange structure a generally radially outwardly and axially inwardly opening annular groove complementary to said rounded shoulder and thereby seating on said shoulder, said radially inwardly extending flange portion of the cover member engaging said non-metallic member generally opposite to said groove in the non-metallic member and clamping the same against said rounded shoulder.

3. In a wheel structure including a tire rim having intermediate and terminal flanges and supporting a tire with the sidewall projecting generally radially outwardly beyond the terminal flange, a cover assembly for overlying disposition to the outer side of the wheel including a sheet metal cover member having an outer marginal portion having therebehind a cover retaining flange structure comprising a generally radially inwardly extending portion and a generally axially inwardly extending portion with a radially inwardly projecting juncture rib of substantial radius bulging radially inwardly substantially beyond said axially inwardly extending portion and providing a radially outwardly opening annular groove, said axially inwardly extending flange portion having a free terminal structure with cover retaining means thereon engageable with a portion of said intermediate flange in press-on, pry-off relation, and a tire sidewall simulating non-metallic ring member having a thickened inner marginal flange structure retainingly engaged within said groove and projecting generally radially outwardly beyond said cover marginal portion to a diameter for overlying the tire sidewall radially outwardly beyond said terminal flange, said radially inwardly extending flange portion of the cover member engaging and clamping a portion of said non-metallic member radially outwardly adjacent to said thickened flange structure against the tire rim, said portion of said non-metallic member having on the axially outer side of the non-metallic member a groove within which an edge defining said marginal portion is engaged.

4. In a wheel structure including a multi-flanged tire rim having a radially inwardly facing intermediate flange and an annular rim shoulder disposed axially outwardly of said intermediate flange, a circular metallic cover member having an outer marginal portion confronting the annular rim shoulder and also having cover retaining structure on the axially inner side of the cover member cooperable with the intermediate rim flange to retain the cover in removable assembly on the wheel, and a radially outer non-metallic ring member overlying the tire rim radially outwardly of the outer marginal cover portion and projecting therebeyond into side wall-simulating relation to the side wall of a tire supported by the tire rim, said ring member having an inner marginal ring portion underlapping the outer marginal cover portion and with the outer marginal cover portion through the action of the retaining structure of the cover member with said intermediate flange clamping the inner underlapping marginal ring portion against said annular rim shoulder and thereby sustaining the ring member in assembly on the wheel, the cover member having behind said outer marginal portion of the cover member axially spaced generally confronting shoulders between and by which the underlapping inner marginal ring portion is retainingly directly engaged to enable handling of the cover member and the ring member as a unitary assembly when the cover member and ring member are removed from the wheel, said cover member having a radially outwardly opening annular groove defined at axially inner and axially outer sides thereof by said confronting shoulders, and said inner marginal ring portion comprising an inner terminal structure retainingly engaged within said groove and by said confronting shoulders.

References Cited in the file of this patent

UNITED STATES PATENTS

| | | |
|---|---|---|
| 2,368,240 | Lyon | Jan. 30, 1945 |
| 2,421,384 | Lyon | June 3, 1947 |
| 2,426,109 | Lyon | Aug. 17, 1947 |
| 2,629,957 | Lyon | Mar. 3, 1953 |
| 2,696,409 | Barnes | Dec. 7, 1954 |
| 2,729,510 | Lyon | Jan. 3, 1956 |
| 2,757,985 | Lyon | Aug. 7, 1956 |
| 2,964,355 | Buerger | Dec. 13, 1960 |

FOREIGN PATENTS

| | | |
|---|---|---|
| 401,345 | Great Britain | Nov. 13, 1933 |
| 1,061,278 | France | Nov. 25, 1934 |